US009440859B2

(12) United States Patent
Kim et al.

(10) Patent No.: US 9,440,859 B2
(45) Date of Patent: Sep. 13, 2016

(54) SILICON CARBIDE POWDER COMPRISING ALPHA PHASE SILICON CARBIDE GRANULES OF TRIMODAL PARTICLE SIZE DISTRIBUTION AND LOW IMPURITIES

(71) Applicants: LG INNOTEK CO., LTD., Seoul (KR); RESEARCH BUSINESS FOUNDATION SUNGKYUNKWAN UNIVERSITY, Suwon-si, Gyeonggi-do (KR)

(72) Inventors: Byung Sook Kim, Seoul (KR); Dong Geun Shin, Seoul (KR); Jung Eun Han, Seoul (KR); Kyoung Seok Min, Seoul (KR)

(73) Assignees: LG INNOTEK CO., LTD, Seoul (KR); RESEARCH BUSINESS FOUNDATION SUNGKYUNKWAN UNIVERSITY, Suwon-Si (KR)

(*) Notice: Subject to any disclaimer, the term of this patent is extended or adjusted under 35 U.S.C. 154(b) by 0 days.

(21) Appl. No.: 14/408,151

(22) PCT Filed: Jul. 10, 2013

(86) PCT No.: PCT/KR2013/006163
§ 371 (c)(1),
(2) Date: Dec. 15, 2014

(87) PCT Pub. No.: WO2014/061898
PCT Pub. Date: Apr. 24, 2014

(65) Prior Publication Data
US 2015/0218005 A1 Aug. 6, 2015

(30) Foreign Application Priority Data
Oct. 18, 2012 (KR) .................. 10-2012-0115736

(51) Int. Cl.
*C01B 31/36* (2006.01)
*B32B 5/16* (2006.01)
*C04B 35/565* (2006.01)

(52) U.S. Cl.
CPC .............. *C01B 31/36* (2013.01); *C04B 35/565* (2013.01); *C01P 2004/51* (2013.01);
(Continued)

(58) Field of Classification Search
CPC ............ C01P 2004/51; C01P 2004/60; C01P 2004/61; C01B 31/36
USPC .......................................... 423/345; 428/402
See application file for complete search history.

(56) References Cited

U.S. PATENT DOCUMENTS 4,123,286 A   10/1978  Coppola et al.
5,863,325 A * 1/1999  Kanemoto et al. ........... 117/105
(Continued)

FOREIGN PATENT DOCUMENTS

KR  10-2005-0063482 A   6/2005
KR  10-2011-0022424 A   3/2011
(Continued)

OTHER PUBLICATIONS

Montoya-Davila et al., Effect of bi- and trimodal size distribution on the superficial hardness of Al/SiCp Composites prepared by pressureless infiltration, Powder Technology 176 (2007) 66-71.*
(Continued)

*Primary Examiner* — Holly Le
(74) *Attorney, Agent, or Firm* — LRK Patent Law Firm

(57) ABSTRACT

A silicon carbide powder includes at least one group selected from a first group comprising an alpha phase silicon carbide pulverulent body of which a granule size (D50) is greater than 0 μm and less than 45 μm with impurities less than 10 ppm, a second group comprising an alpha phase silicon carbide pulverulent body of which a granule size is greater than 45 μm and less than 75 μm with impurities less than 10 ppm, and a third group comprising an alpha phase silicon carbide pulverulent body of which a granule size is greater than 75 μm and less than 110 μm with impurities less than 10 ppm. In addition, a method for preparing a silicon carbide powder includes adding seeds to a beta silicon carbide powder, and forming an alpha silicon carbide powder by heat treating the beta silicon carbide powder.

2 Claims, 9 Drawing Sheets

(52) U.S. Cl.
CPC ...... *C01P 2004/54* (2013.01); *C01P 2004/61* (2013.01); *C01P 2006/80* (2013.01); *C04B 2235/383* (2013.01); *C04B 2235/3834* (2013.01); *C04B 2235/5427* (2013.01); *C04B 2235/5436* (2013.01); *C04B 2235/5445* (2013.01); *C04B 2235/5454* (2013.01); *C04B 2235/72* (2013.01); *C04B 2235/782* (2013.01); *C04B 2235/786* (2013.01); *Y10T 428/2982* (2015.01)

(56) References Cited

U.S. PATENT DOCUMENTS

| | | | |
|---|---|---|---|
| 6,514,338 B2 * | 2/2003 | Shigeto et al. | 117/84 |
| 6,627,169 B1 | 9/2003 | Itoh et al. | |
| 6,780,243 B1 * | 8/2004 | Wang et al. | 117/105 |

FOREIGN PATENT DOCUMENTS

| | | |
|---|---|---|
| KR | 10-2011-0073872 A | 6/2011 |
| WO | 2012/067011 A1 | 5/2012 |

OTHER PUBLICATIONS

Search Report for International Application No. PCT/KR2013/006163, (2013).

SIPO Office Action for Chinese Application No. 201380054592.9 which corresponds to the above-referenced U.S. application; 2013.

* cited by examiner

SILICON CARBIDE POWDER COMPRISING ALPHA PHASE SILICON CARBIDE GRANULES OF TRIMODAL PARTICLE SIZE DISTRIBUTION AND LOW IMPURITIES

TECHNICAL FIELD

The present invention relates to a silicon carbide powder and a preparation method thereof, and more particularly, to a preparation method of a silicon carbide powder using a silicon carbide fine powder.

BACKGROUND ART

Silicon carbide (SiC) is strong at a high temperature and excellent in creep resistance and resistance to abrasiveness, oxidation, and corrosion, etc. Silicon carbide is present in a β phase having a cubic crystal structure and in an α phase having a hexagonal crystal structure. The β phase is stable in a temperature range of 1400-1800° C., and the α phase is stable above 2000° C.

Silicon carbide is widely used as an industrial structural material and has been applied in the semiconductor industry recently. For this reason, a high-purity silicon carbide powder which is stable at a high temperature is desired.

A silicon carbide powder may be prepared by, for example, an Acheson method, a carbothermal reduction method, a chemical vapor deposition (CVD) method, etc. According to the Acheson method, an α-phase silicon carbide powder may be obtained by carbothermal reduction of a silicon source and a carbon source at a high temperature (e.g., 2200° C. to 2400° C.). However, since the silicon carbide powder prepared according to the above method is low in purity, an additional purification process is required.

In contrast, a high-purity silicon carbide powder may be obtained by synthesizing a purified material at a relatively low temperature. However, the β-phase silicon carbide fine powder is easily obtained at a low temperature, which causes instability at high temperatures.

On the other hand, β-phase silicon carbide has a lower vapor pressure than α-phase silicon carbide. Thus, β-phase silicon carbide evaporates and agglomerates into α-phase silicon carbide powder when the β-phase silicon carbide powder is heat treated at a high temperature. In this case, there are problems in that the β phase and the α phase coexist when the heat treatment time is short, and although the high-purity α-phase silicon carbide powder may be obtained when the heat treatment time is long, granules grow to a size greater than hundreds of micrometers.

DISCLOSURE

Technical Problem

A technical problem of the present invention is directed to providing a high-purity silicon carbide powder which is stable at a high temperature and a preparation method thereof.

Another technical problem of the present invention is directed to providing a preparation method of silicon carbide powders of various granule sizes.

Technical Solution

A preparation method of a silicon carbide powder according to one aspect of the present invention includes: adding seeds to a beta phase silicon carbide powder, and heat treating the beta phase silicon carbide powder to form an alpha phase silicon carbide powder.

The heat treating may be performed for more than 4 hours at 2000° C. to 2200° C.

Granule sizes of the alpha silicon carbide powder may be adjusted according to an amount of the seeds added.

The amount of the seeds added may be 1 wt % to 7 wt % with respect to the beta phase silicon carbide powder.

The added seeds may be an alpha silicon carbide.

A silicon carbide powder according to another aspect of the present invention comprises an alpha phase silicon carbide pulverulent body having a granule size (D50) of 45 μm to 110 μm and including impurities at less than 10 ppm.

A silicon carbide powder according to another aspect of the present invention includes at least one group selected from a first group including an alpha silicon carbide pulverulent body of which a granule size (D50) is greater than 0 μm and less than 45 μm with impurities less than 10 ppm, a second group including an alpha silicon carbide pulverulent body of which a granule size is greater than 45 μm and less than 75 μm with impurities less than 10 ppm, and a third group including an alpha silicon carbide pulverulent body of which a granule size is greater than 75 μm and less than 110 μm with impurities less than 10 ppm.

The first group, the second group and the third group may be differentiated from one another according to an amount of seeds added in a preparation of the alpha silicon carbide pulverulent body.

Advantageous Effects

According to an exemplary embodiment of the present invention, a high-purity silicon carbide powder which is stable at a high temperature may be obtained. Also, a granule size of the obtained silicon carbide powder may be adjusted by adjusting a heat treatment condition and a ratio of seeds, etc.

MODES OF THE INVENTION

Figure 1:
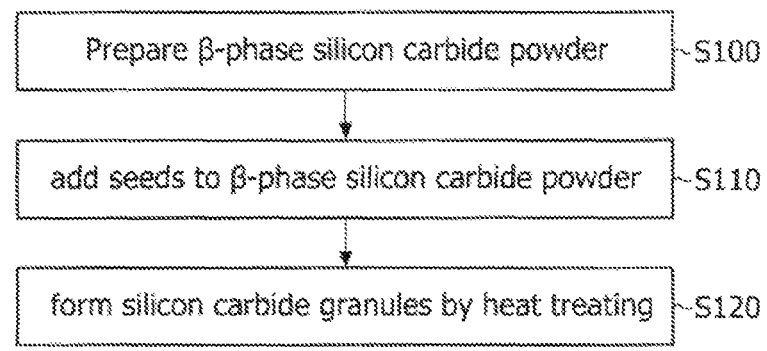
FIG. 1 illustrates a flow chart representing a preparation method of a silicon carbide powder according to an exemplary embodiment of the present invention.

The present invention may have various exemplary embodiments and various modifications may be employed, and thus specific exemplary embodiments are illustrated in the drawings and will be described. However, the specific exemplary embodiments are not intended to limit the present invention, and it will be understood that all modifications, equivalents and substitutes in the spirit and scope of the present invention are included.

Although terms including ordinals such as "second," "first," etc. may be used to describe various elements, these elements are not limited by these terms. These terms are used only to distinguish one element from another. For example, a second element could be termed a first element, and similarly, a first element could be termed a second element, without departing from the scope of the present invention. The term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, exemplary embodiments will be described in detail referring to the drawings, in which identical or corresponding elements are referred to by the same reference number throughout the drawings and repeated description of the elements will be omitted.

A high-purity α-phase silicon carbide powder may be obtained by heat treating a high-purity β-phase silicon carbide powder at a high temperature. However, there is a range in which the α-phase silicon carbide and the β-phase silicon carbide coexist during a process of the β-phase silicon carbide evaporating and agglomerating into the α-phase silicon carbide. Thus, in order to obtain a high-purity α-phase silicon carbide powder, the heat treatment is required to be maintained for a desired time. However, if the heat treatment is maintained for a desired time, then overgrown α-phase silicon carbide granules (e.g., greater than 150 μm) are obtained.

On the other hand, the demand for an α-phase silicon carbide powder having various granule sizes (e.g., tens of micrometers) is growing in the market.

According to an exemplary embodiment of the present invention, a β-phase silicon carbide powder is heat treated at a high temperature in order to obtain an α-phase silicon carbide powder which is stable at a high temperature. In this case, seeds are added to the β-phase silicon carbide in order to adjust a granule size of an α-phase silicon carbide powder formed therefrom.

FIG. 1 illustrates a flow chart representing a preparation method of a silicon carbide powder of the present invention.

Referring to FIG. 1, first, a β-phase silicon carbide powder is prepared (S100). The β-phase silicon carbide powder may be obtained by mixing a silicon source (Si source) and a carbon source (C source) and then heat treating the mixed powder.

The silicon source is one of various materials capable of providing silicon. The silicon source may be, for example, more than one selected from the group consisting of fumed silica, fine silica, silica sol, silica gel, quartz powder, and mixtures thereof.

The carbon source may be a solid carbon source or an organic carbon compound. The solid carbon source may be, for example, more than one selected from the group consisting of graphite, carbon black, carbon nanotubes (CNTs), fullerenes, and mixtures thereof. The organic carbon compound may be, for example, more than one selected from the group consisting of phenol resins, franc resins, xylene resins, polyimides, polyurethanes, polyvinyl alcohols, polyacrylonitriles, polyvinyl acetates, cellulose, and a mixture thereof.

The silicon source and the carbon source may be mixed by a wet method or a dry method. The silicon source and the carbon source may be mixed, for example, by using a ball mill, an attrition mill, a 3-roll mill, etc. The mixed powder may be collected, for example, using a sieve.

A heat treatment process of the mixed powder may be divided into a carbonization process and a synthesis process. The carbonization process may be performed, for example, under a condition of 600° C. to 1000° C., and the synthesis process may be performed, for example, under a condition of 1300° C. to 1700° C. for a desired time (e.g., 3 hours).

The above-mentioned preparation processes of the β-phase silicon carbide powder are for exemplary purposes only, and a β-phase silicon carbide powder may be prepared according to various methods.

Next, an α-phase silicon carbide powder is added as seeds to the α-phase silicon carbide powder (S110), and by heat treating them, silicon carbide granules are formed (S120).

The heat treatment may be performed, for example, at a high temperature greater than 2000° C. (e.g., 2000° C. to 2200° C.). If the β-phase silicon carbide powder is heat treated at a high temperature, evaporation-agglomeration occurs due to a high vapor pressure difference between the β-phase silicon carbide and the α-phase silicon carbide, and granules may grow rapidly due to recrystallization. On the other hand, there is a range in which the β-phase silicon carbide and the α-phase silicon carbide coexist in a phase transition from the β-phase silicon carbide to the α-phase silicon carbide. In order to obtain the α-phase silicon carbide only, the heat treatment may be maintained for more than 4 hours.

However, if the β-phase silicon carbide is maintained for more than 4 hours, overgrown silicon carbide granules having a granule size (D50) greater than 150 μm may be obtained. Thus, in order to adjust the granule size of the silicon carbide powder, the seeds may be added before heat treating the β-phase silicon carbide.

In this case, the α-phase silicon carbide powder added as the seeds performs nucleation. That is, the β-phase silicon carbide evaporates at a high temperature and agglomerates on a surface of the α-phase silicon carbide powder added as the seeds. According to an amount of the seeds performing nucleation, a granule size of a formed silicon carbide powder may vary. For example, as the amount of the α-phase silicon carbide powder added as the seeds is greater, the size of formed granules reduces. Thus, the amount of the α-phase silicon carbide powder added as the seeds may be adjusted according to a desired granule size.

Accordingly, even when the β-phase silicon carbide is maintained for more than 4 hours to obtain a high-purity α-phase silicon carbide powder, formation of overgrown silicon carbide granules may be prevented.

According to an exemplary embodiment of the present invention, a silicon carbide powder including at least one group selected from a first group including an alpha silicon carbide pulverulent body of which a granule size (D50) is greater than 0 μm and less than 45 μm, a second group including an alpha silicon carbide pulverulent body of which a granule size is greater than 45 μm and less than 75 μm and a third group including an alpha silicon carbide pulverulent body of which a granule size is greater than 75 μm and less than 110 μm may be obtained. In addition, according to an exemplary embodiment of the present invention, since a granule size may be adjusted without a grinding process, alpha silicon carbide granules of which impurities are less than 10 ppm (99.999% pure) may be obtained. Here, the impurities may mean oxygen or nitrogen, etc. contained in the alpha silicon carbide granules.

Hereinafter, a preparation method of a silicon carbide powder according to an exemplary embodiment of the present invention is illustrated in detail according to comparative examples and exemplary examples.

TABLE 1

| | Amount of seed (wt %) | Temperature in heat treatment (° C.) | Duration of heat treatment (hours) |
|---|---|---|---|
| Comparative example 1 | 0 | 2150 | 1 |
| Comparative example 2 | 0 | 2150 | 3 |
| Comparative example 3 | 0 | 2150 | 5 |
| Exemplary example 1 | 1 | 2150 | 5 |
| Exemplary example 2 | 3 | 2150 | 5 |
| Exemplary example 3 | 5 | 2150 | 5 |
| Exemplary example 4 | 7 | 2150 | 5 |

Comparative Example 1

A β-phase silicon carbide powder of which an average granule size was 1.7 μm was placed in a graphite crucible and a temperature was raised to 1450° C. under a vacuum atmosphere, raised to 2150° C. under an argon atmosphere, maintained for 1 hour, and then cooled naturally.

Comparative Example 2

A β-phase silicon carbide powder of which an average granule size was 1.7 μm was placed in a graphite crucible and a temperature was raised to 1450° C. under a vacuum atmosphere, raised to 2150° C. under an argon atmosphere, maintained for 3 hours, and then cooled naturally.

Comparative Example 3

A β-phase silicon carbide powder of which an average granule size was 1.7 μm was placed in a graphite crucible and a temperature was raised to 1450° C. under a vacuum atmosphere, raised to 2150° C. under an argon atmosphere, maintained for 5 hours, and then cooled naturally.

Figure 2:
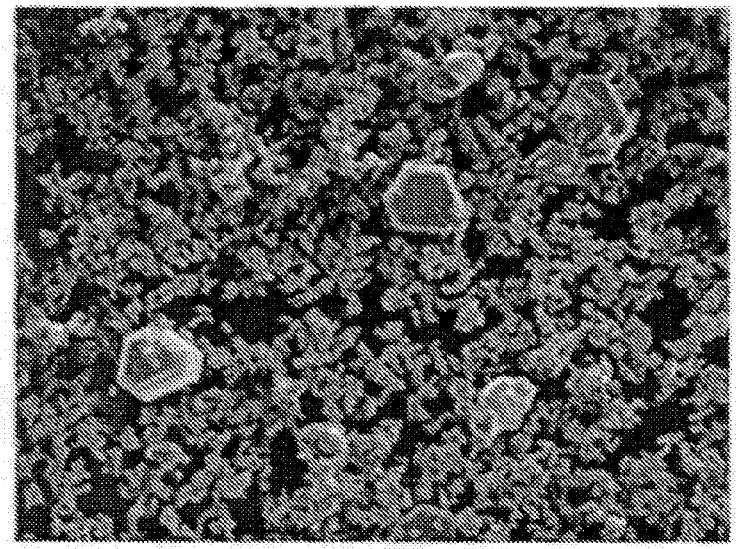
FIG. 2 illustrates a result of a comparative example 1.
Figure 3:
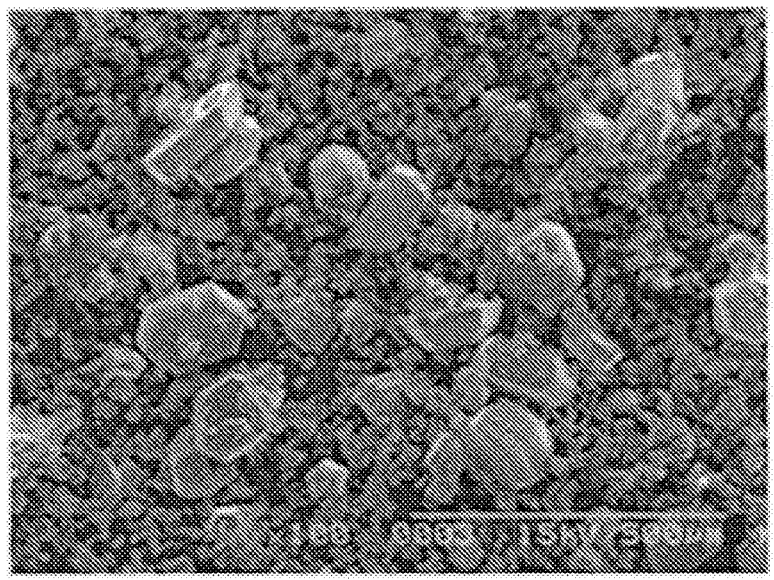
FIG. 3 illustrates a result of a comparative example 2.
Figure 4:
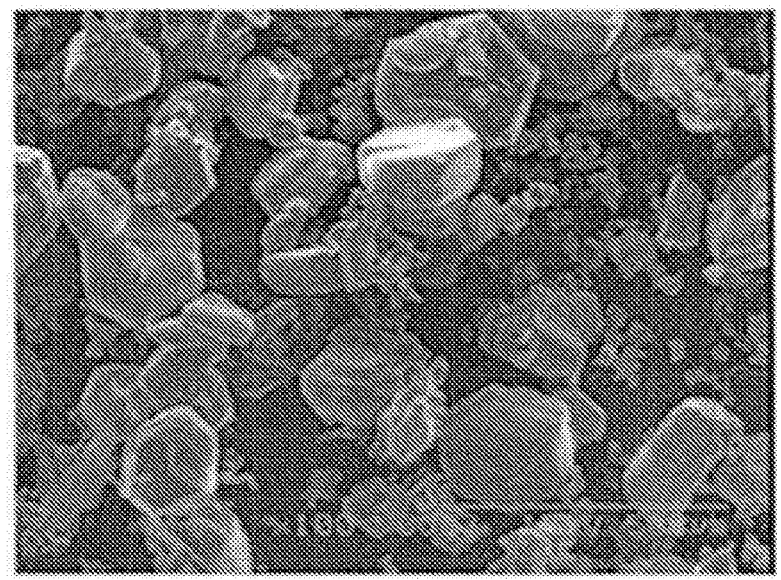
FIG. 4 illustrates a result of a comparative example 3.
Figure 5:
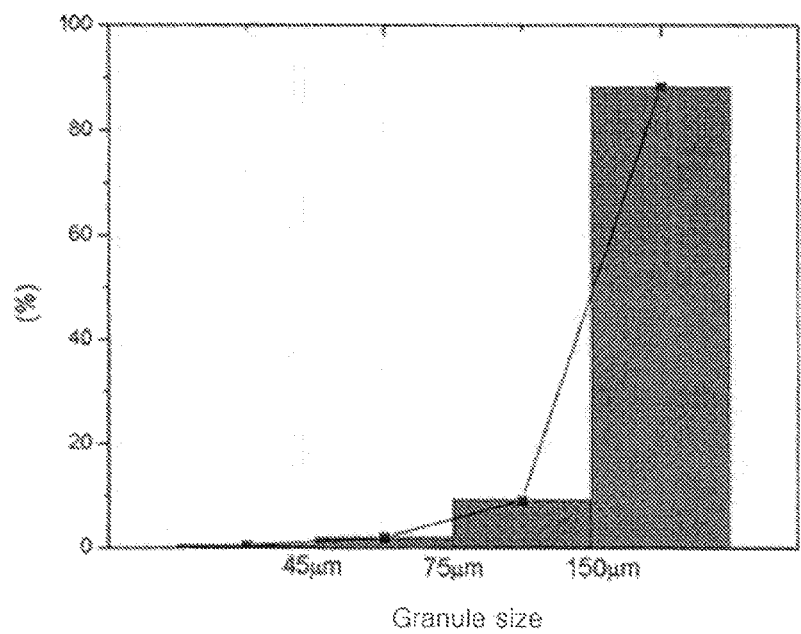
FIG. 5 illustrates a graph representing a granule size distribution according to the comparative example 3.

FIG. 2 illustrates a result of the comparative example 1, FIG. 3 illustrates a result of the comparative example 2, FIG. 4 illustrates a result of the comparative example 3, and FIG. 5 illustrates a graph representing a granule size distribution according to the comparative example 3.

Referring to Table 1 and FIG. 2 through FIG. 4, it may be seen that a β-phase silicon carbide and an α-phase silicon carbide coexist when a maintenance time in the heat treatment is short, while a ratio of the α-phase silicon carbide increases as the maintenance time in the heat treatment becomes long.

However, as illustrated in FIG. 5, if the maintenance time in the heat treatment becomes longer, a granule size (D50) greatly increases to more than 150 μm. Thus, in order to obtain a high-purity α-phase silicon carbide having a granule size less than 150 μm, an α-phase silicon carbide powder may be added as seeds to the β-phase silicon carbide powder.

Exemplary Example 1

A 1 wt % α-phase silicon carbide powder was added to a β-phase silicon carbide powder of which an average granule size was 1.7 μm, they were placed in a graphite crucible, and a temperature was raised to 1450° C. under a vacuum atmosphere, raised to 2150° C. under an argon atmosphere, maintained for 5 hours, and then cooled naturally.

Exemplary Example 2

A 3 wt % α-phase silicon carbide powder was added to a β-phase silicon carbide powder of which an average granule size was 1.7 μm, they were placed in a graphite crucible, and a temperature was raised to 1450° C. under a vacuum atmosphere, raised to 2150° C. under an argon atmosphere, maintained for 5 hours, and then cooled naturally.

Exemplary Example 3

A 5 wt % α-phase silicon carbide powder was added to a β-phase silicon carbide powder of which an average granule size was 1.7 μm, they were placed in a graphite crucible, and a temperature was raised to 1450° C. under a vacuum atmosphere, raised to 2150° C. under an argon atmosphere, maintained for 5 hours, and then cooled naturally.

Exemplary Example 4

A 7 wt % α-phase silicon carbide powder was added to a β-phase silicon carbide powder of which an average particle size is 1.7 μm, they were placed in a graphite crucible, and a temperature is raised to 1450° C. under a vacuum atmosphere, raised to 2150° C. under an argon atmosphere, maintained for 5 hours, and then cooled naturally.

Figure 6:
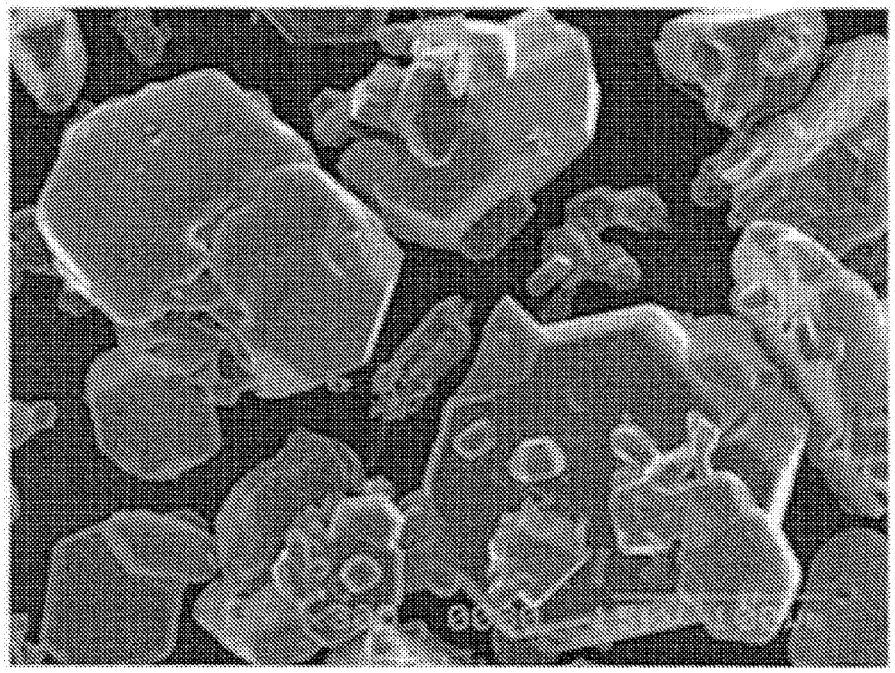
FIG. 6 illustrates a result of an exemplary embodiment 1.
Figure 7:
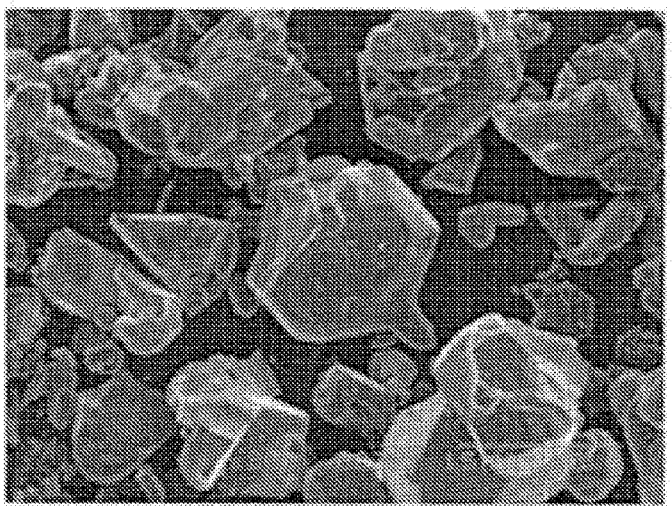
FIG. 7 illustrates a result of an exemplary embodiment 2.
Figure 8:
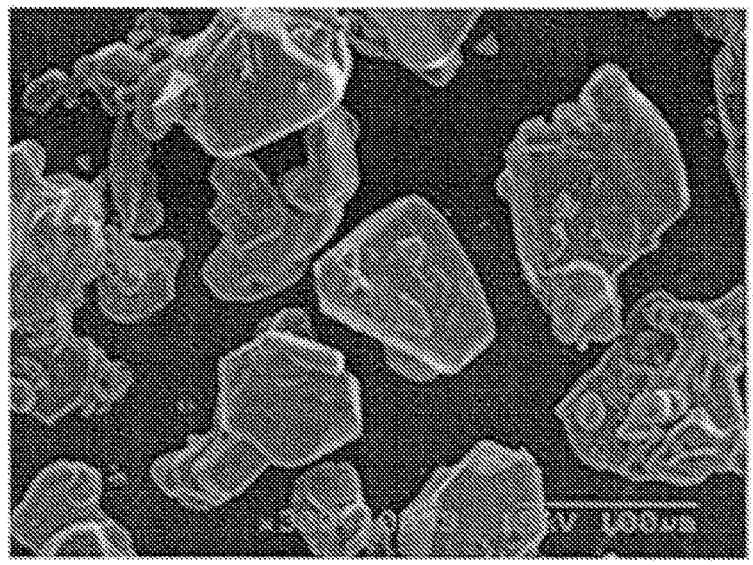
FIG. 8 illustrates a result of an exemplary embodiment 3.
Figure 9:
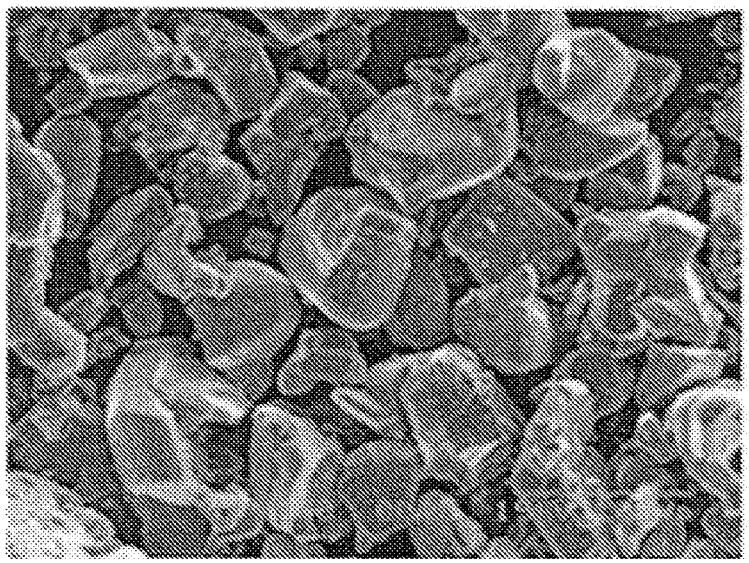
FIG. 9 illustrates a result of an exemplary embodiment 4.
Figure 10:
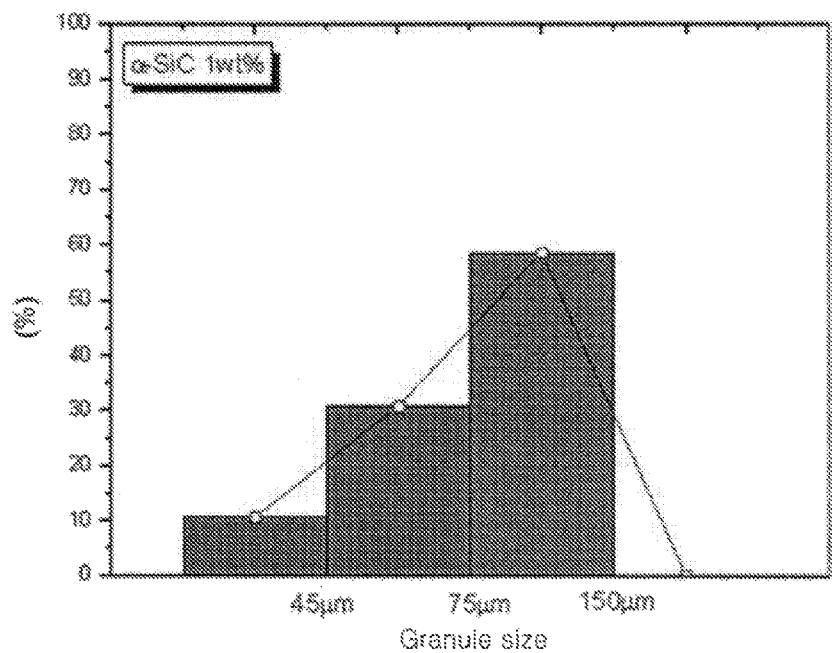
FIG. 10 illustrates a graph representing a granule size distribution of the exemplary embodiment 1.
Figure 11:
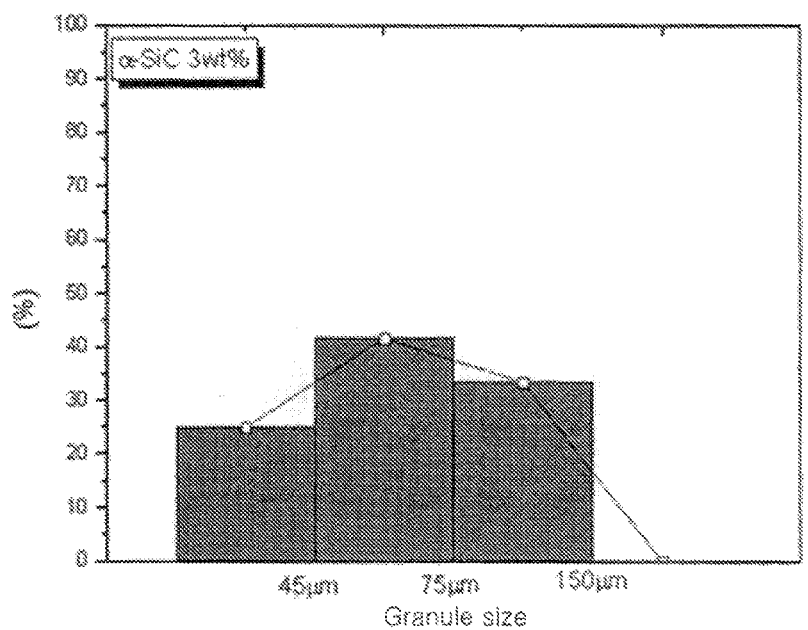
FIG. 11 illustrates a graph representing a granule size distribution of the exemplary embodiment 2.
Figure 12:
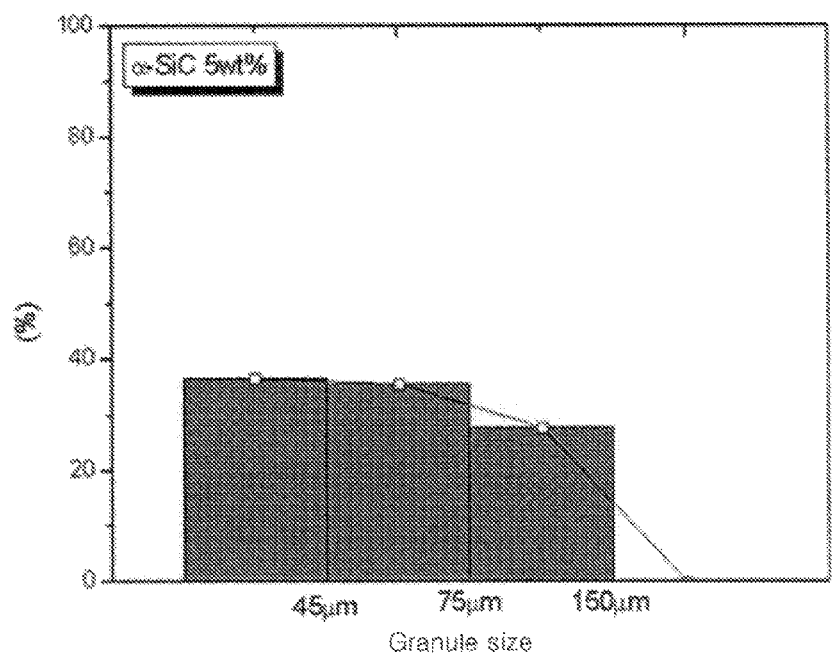
FIG. 12 illustrates a graph representing a granule size distribution of the exemplary embodiment 3.
Figure 13:
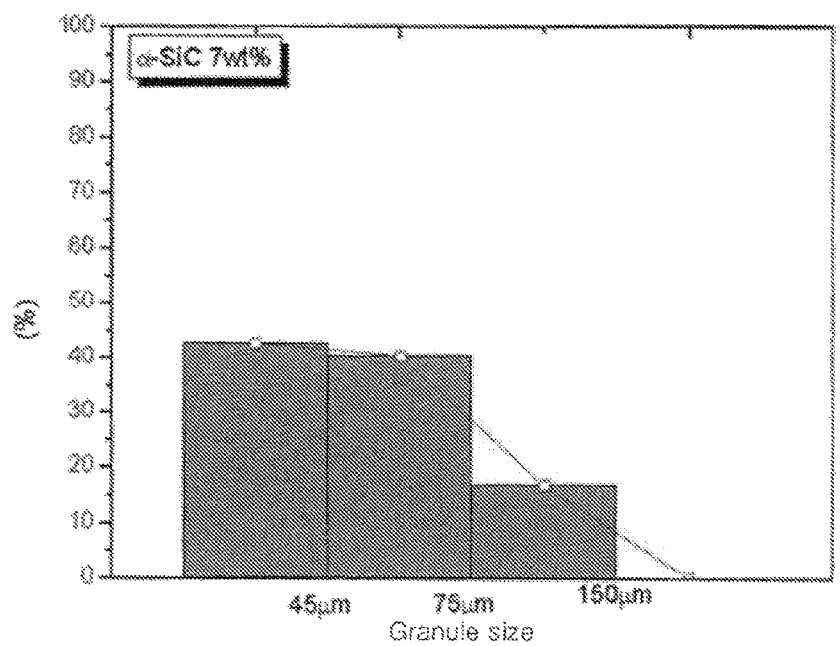
FIG. 13 illustrates a graph representing a granule size distribution of the exemplary embodiment 4.

FIG. 6 illustrates a result of the exemplary embodiment 1, FIG. 7 illustrates a result of the exemplary embodiment 2, FIG. 8 illustrates a result of the exemplary embodiment 3, and FIG. 9 illustrates a result of the exemplary embodiment 4. FIG. 10 illustrates a graph representing a granule size distribution of the exemplary embodiment 1, FIG. 11 illustrates a graph representing a granule size distribution of the exemplary embodiment 2, FIG. 12 illustrates a graph representing a granule size distribution of the exemplary embodiment 3, and FIG. 13 illustrates a graph representing a granule size distribution of the exemplary embodiment 4.

Referring to Table 1 and FIG. 6 through FIG. 13, it may be seen that a granule size reduces as more of the α-phase silicon carbide powder is added. That is, when an amount of the α-phase silicon carbide powder was 1 wt % with respect to the β-phase silicon carbide powder, a ratio of a powder having a granule size of 75 μm to 150 μm in a final powder was the highest. In contrast, when an amount of the α-phase silicon carbide powder was 3 wt % with respect to the β-phase silicon carbide powder, a ratio of a powder having a granule size of 45 μm to 75 μm in a final powder was the highest, and when an amount of the α-phase silicon carbide powder was greater than 5 wt % with respect to the β-phase silicon carbide powder, a ratio of a powder having a granule size less than 45 μm in a final powder was the highest. This is because a granule size is reduced when more sizes of the seeds are used in the nucleation.

According to an exemplary embodiment of the present invention, high-purity α-phase silicon carbide granules may be obtained by heat treating a high-purity β-phase silicon carbide powder at a high temperature. In this case, quality of the obtained α-phase silicon carbide granules may be improved by lengthening heat treatment time. In addition, a granule size of the obtained silicon carbide powder may be adjusted by using an amount of seeds added thereto. Accordingly, market demands for an α-phase silicon carbide powder having various granule sizes may be satisfied, and a purity of the material may increase since a grinding process is not performed in order to adjust a granule size.

Although preferred exemplary embodiments of the present invention have been described above, those skilled in the art will understand that the present invention may be variously modified and changed without departing from the spirit and scope of the present invention described in the following claims.

The invention claimed is:

1. A silicon carbide powder comprising at least one group selected from a first group comprising an alpha phase silicon carbide pulverulent body of which a granule size (D50) is greater than 0 μm and less than 45 μm with impurities less than 10 ppm, a second group comprising an alpha phase silicon carbide pulverulent body of which a granule size is greater than 45 μm and less than 75 μm with impurities less than 10 ppm, and a third group comprising an alpha phase silicon carbide pulverulent body of which a granule size is greater than 75 μm and less than 110 μm with impurities less than 10 ppm.

2. The silicon carbide powder of claim 1, wherein the first group, the second group and the third group are differentiated from one another according to an amount of seeds added in a preparation of the alpha phase silicon carbide pulverulent body.

* * * * *